US012138937B2

(12) United States Patent
Dowell et al.

(10) Patent No.: US 12,138,937 B2
(45) Date of Patent: Nov. 12, 2024

(54) PRINTING FLUID CIRCULATION

(71) Applicant: Hewlett-Packard Development Company, L.P., Spring, TX (US)

(72) Inventors: Daniel D Dowell, Corvallis, OR (US); Ronald Ender, Corvallis, OR (US); Seth Haddix, Corvallis, OR (US); Jon A Crabtree, San Diego, CA (US); Jeffrey F Bell, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 128 days.

(21) Appl. No.: 17/928,276

(22) PCT Filed: May 29, 2020

(86) PCT No.: PCT/US2020/035194
§ 371 (c)(1),
(2) Date: Nov. 28, 2022

(87) PCT Pub. No.: WO2021/242255
PCT Pub. Date: Dec. 2, 2021

(65) Prior Publication Data
US 2023/0202184 A1 Jun. 29, 2023

(51) Int. Cl.
*B41J 2/175* (2006.01)
*B41J 2/14* (2006.01)
*B41J 2/18* (2006.01)
*B41J 2/19* (2006.01)

(52) U.S. Cl.
CPC ....... *B41J 2/17563* (2013.01); *B41J 2/14145* (2013.01); *B41J 2/18* (2013.01); *B41J 2/19* (2013.01); *B41J 2202/12* (2013.01)

(58) Field of Classification Search
CPC ...... B41J 2/17563; B41J 2/14145; B41J 2/18; B41J 2/19; B41J 2202/12
See application file for complete search history.

(56) References Cited

U.S. PATENT DOCUMENTS 4,628,330 A 12/1986 Suga et al.
4,788,557 A 11/1988 Howkins
5,023,630 A 6/1991 Moriyama
5,270,740 A 12/1993 Naruse et al.
5,754,204 A 5/1998 Kitahara
5,831,650 A 11/1998 Reinten
5,877,789 A 3/1999 Reinten
6,350,019 B1 2/2002 Shingai et al.
6,619,777 B2 9/2003 Chang
(Continued)

FOREIGN PATENT DOCUMENTS

EP 0046676 A1 3/1982
EP 0336043 A2 10/1989
(Continued)

*Primary Examiner* — Geoffrey S Mruk
(74) *Attorney, Agent, or Firm* — Foley & Lardner LLP

(57) ABSTRACT

An example printing fluid pen comprises a plurality of fluid ports, including an inlet port to direct fluid from a fluid reservoir to a fluid ejection device, and a recirculation port to direct fluid from the fluid ejection device out of the inkjet pen. The example pen also includes a plurality of parallel fluid pressure regulators fluidly coupled with the inlet port, each of the plurality of parallel fluid pressure regulators to receive fluid from the inlet fluid port.

15 Claims, 11 Drawing Sheets

(56) References Cited

U.S. PATENT DOCUMENTS

| | | | |
|---|---|---|---|
| 7,182,432 | B2 | 2/2007 | Van Den Berg et al. |
| 7,401,904 | B2 | 7/2008 | Sekiguchi |
| 7,506,970 | B2 | 3/2009 | Mita |
| 7,517,064 | B2 | 4/2009 | Sugahara |
| 7,658,474 | B2 | 2/2010 | Sugahara |
| 7,673,953 | B2 | 3/2010 | Yamashita |
| 7,703,893 | B2 | 4/2010 | Groninger et al. |
| 7,789,492 | B2 | 9/2010 | Akahane |
| 7,837,294 | B2 | 11/2010 | Umeda |
| 7,857,432 | B2 | 12/2010 | Stephens et al. |
| 7,862,138 | B2 | 1/2011 | Haines et al. |
| 7,922,312 | B2 * | 4/2011 | Haines ................. B41J 2/17553 347/92 |
| 8,020,955 | B2 | 9/2011 | Shibata |
| 8,449,059 | B2 | 5/2013 | Yamashita |
| 8,851,633 | B2 | 10/2014 | Kubo et al. |
| 8,939,531 | B2 | 1/2015 | Govyadinov et al. |
| 9,492,997 | B2 | 11/2016 | Zhang et al. |
| 9,724,926 | B2 * | 8/2017 | Keefe .................. B41J 2/17596 |
| 9,878,535 | B2 | 1/2018 | Kaneko et al. |
| 9,878,539 | B2 | 1/2018 | Hayashi |
| 10,576,749 | B2 | 3/2020 | Moriwaki |
| 2003/0103096 | A1 | 6/2003 | Sayama |
| 2005/0259124 | A1 | 11/2005 | Sekiguchi |
| 2009/0207211 | A1 | 8/2009 | Ito |
| 2009/0267976 | A1 | 10/2009 | Lee et al. |
| 2010/0220137 | A1 | 9/2010 | Shindo |
| 2011/0211022 | A1 | 9/2011 | Yonekubo |
| 2013/0083121 | A1 | 4/2013 | Higashikawa et al. |
| 2015/0091962 | A1 | 4/2015 | Naito et al. |
| 2017/0096007 | A1 | 4/2017 | Kakiuchi |
| 2018/0001638 | A1 | 1/2018 | Wang et al. |
| 2018/0201023 | A1 | 7/2018 | Sato et al. |
| 2019/0001671 | A1 | 1/2019 | Yamada et al. |

FOREIGN PATENT DOCUMENTS

| | | | |
|---|---|---|---|
| EP | 0752312 | A1 | 1/1997 |
| EP | 1106356 | A1 | 6/2001 |
| EP | 1108543 | A1 | 6/2001 |
| EP | 1275507 | A1 | 1/2003 |
| EP | 1466735 | A1 | 10/2004 |
| EP | 1520701 | A1 | 4/2005 |
| EP | 1800866 | A1 | 6/2007 |
| EP | 2923838 | A1 | 9/2015 |
| EP | 3150379 | A1 | 4/2017 |
| EP | 3278989 | A1 | 2/2018 |
| WO | 2012/054017 | A1 | 4/2012 |

* cited by examiner

PRINTING FLUID CIRCULATION

CROSS-REFERENCE TO RELATED APPLICATIONS

This application is a National Stage Application of PCT/US2020/035194, filed May 29, 2020, which is incorporated by reference in its entirety.

BACKGROUND

Printing devices may, at times, eject printing fluid received from a fluid reservoir. The printing fluids may contain colorants that may be made up of solids suspended in a fluid. The printing fluids may be ejected from the printing device via fluid ejection devices, such as including nozzles and ejection chambers, to deposit droplets of printing fluid on a medium or materials.

BRIEF DESCRIPTION OF THE DRAWINGS

Various examples will be described below by referring to the following figures.

Figure 1:
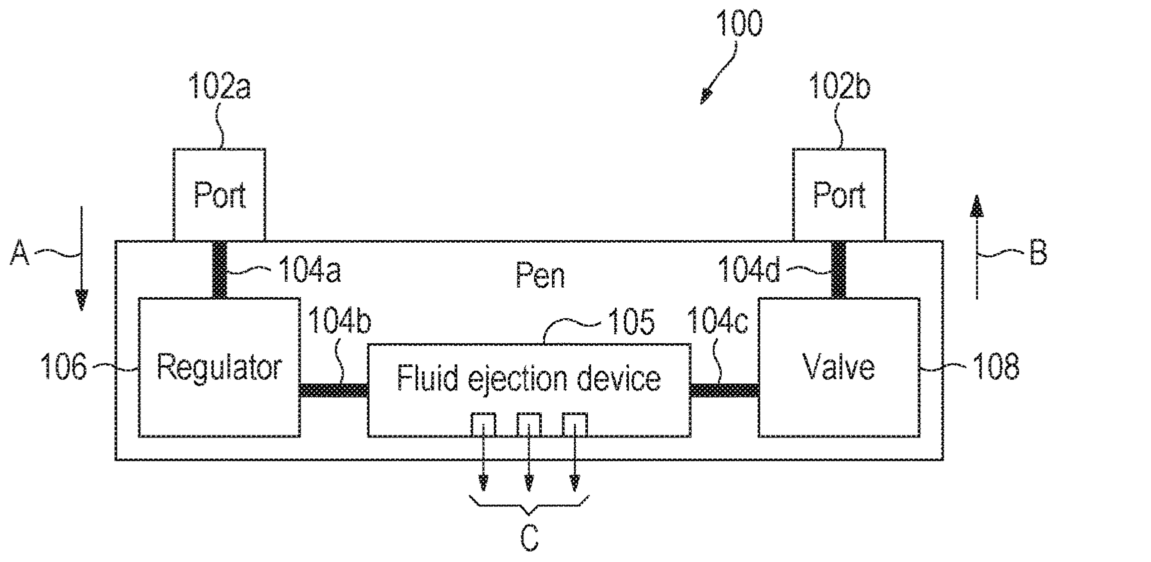
FIG. 1 is a block diagram illustrating an example printing fluid ejection pen.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION throughout this specification to one implementation, an implementation, one case, an example, and/or the like means that a particular feature, structure, characteristic, and/or the like described in relation to a particular implementation, case, and/or example is included in an implementation, case, and/or example of claimed subject matter. Thus, appearances of such phrases, for example, in various places throughout this specification are not necessarily intended to refer to the same implementation, case, and/or example or to any one particular implementation, case, and/or example. Furthermore, it is to be understood that particular features, structures, characteristics, and/or the like described are capable of being combined in various ways in different implementations, cases, and/or examples and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, “in this context” in general without further qualification refers to the context of the present disclosure.

There may be a desire to cause printing fluid to circulate within and/or in proximity to a fluid ejection device. As used herein, the term fluid ejection device refers to a thermal ink ejection device (TIJ) or piezo ejection device (PIJ), by way of non-limiting example. For example, some printing fluids may include solids, such as pigments, that may settle or float (the latter being referred to sometimes as “creaming”) while the printing fluid remains static or in a state of non-motion. In such cases, fluid flow may be sufficient to keep the solids suspended within the fluids. In other cases, fluids may contain dissolved and/or suspended polymers (e.g., in addition to solids) that may also tend to settle or float. For example, as liquid evaporates concentration of the dissolved and/or suspended polymers may increase leading to increased viscosity and/or deteriorating out-of-cap performance. Additionally, components of a fluid ejection device (e.g., fluidic dies of a thermal inkjet device) may experience uneven heating, such as due to operation of resistive and/or thermal elements that may cause hot spots in the device. In such cases, fluidic circulation may also be of interest to dissipate thermal buildup at portions of the fluid ejection device. However, causing fluid to circulate may present certain structural and operational challenges to fluid devices. As used herein, the term “fluid circulation” and like terms refer to fluids that flow within fluid channels, such as within recirculation paths, in order to favor solid suspension and/or thermal dissipation. To be clear, merely transporting fluids to an ejection chamber of a fluid ejection device is not what is contemplated by the term. Instead, fluid circulation refers to fluid paths that allow printing fluids to flow upon command, such as through fluid return paths (e.g., returning back towards a fluid reservoir). At times, the term recirculation is used to refer to circulation back out of a fluid ejection device, such as back towards a fluid reservoir.

Fluid ejection devices may include ejection nozzles (through which fluids, such as printing fluids, are to be ejected towards a medium or substrate), which openings may present challenges to maintaining a fluidic pressure (and thus a rate of fluid flow, or flux) within a fluid channel. For instance, backpressure within the fluid channels, such as due to ejection of printing fluid, may lead to drops in flux in some situations. By way of example, immediately after ejecting printing fluid from a nozzle, printing fluid may cease flowing through a fluid line, may briefly flow in a wrong direction along at least a portion of a fluid line, and/or may flow much more slowly.

Pressure regulators may be used maintain fluid pressure in a fluid line in a range about a set point, which can be desirable, such as to reduce the effects of backpressure. For example, fluids may flow through a pressure regulator prior to flowing towards fluid ejection orifices (e.g., nozzles), and the pressure regulator may dampen effects of backpressure.

It may be possible to enable fluid circulation within a fluid channel that uses pressure regulators on a fluid line corresponding to the fluid channel. This may be done by opening a fluidic element (e.g., a fluid gate) of the pressure regulator to allow fluid flow (e.g., circulation). However, opening the fluidic element of the pressure regulator to allow fluid circulation may lead to a loss of flux on the fluid channel. The loss of flux may contribute to undesirable print quality, such as due to a loss of control of printing fluid droplet size. As such, fluid circulation may be desirable only at points in time for which a drop of flux may be acceptable, such as while a fluid ejection device is being serviced.

With the foregoing in mind, there may be a desire, therefore, for an approach that will enable the use of pressure regulators (e.g., to dampen backflow spikes) and also allow circulation of printing fluid while a printing fluid ejection device is active (e.g., while ejecting printing fluid) without drops in flux (e.g., without flux decreasing below an operational threshold).

The present disclosure thus proposes a system in which a printing fluid pen has a number of fluid ports. A first fluid port is to deliver a printing fluid to an ejection device of the pen (e.g., an input port). A second fluid port is to direct printing fluid out of the pen (e.g., an output port). A pressure regulator is in fluid communication with the first fluid port. And a valve is in fluid communication with the second fluid port. The valve is to open in response to a negative pressure (e.g., negative pressure exceeding a threshold), to enable fluids within the pen to exit via the second fluid port.

The combination of a valve that opens in response to a negative pressure on the outlet port and the pressure regulator in fluid communication with the inlet port may enable fluid circulation, even while ejecting fluid, without undesirable drops in fluid flux (e.g., without flux decreasing below an operational threshold).

Turning to FIG. 1, a block diagram illustrates one implementation of a printing fluid pen 100. As used herein, the term “inkjet” will be used to refer to devices capable of ejecting printing fluids including, but not limited to, inks. Thus, for example, a pen of a three-dimensional (3D) printer may be used to eject an agent that may cause a build material to fuse together as part of an additive printing process. The agent may or may not include colorants, such as pigments. Therefore, by referring to a pen as an inkjet pen is not done in a limiting sense. Indeed, it is intended that such fluid ejection pens could be used in a number of different contexts. Additionally, the term “pen” refers to a structure that may include a housing in which a fluid ejection device and a fluidic die may be arranged along with other components in order to enable ejection of printing fluids. The inkjet pen may be removable in some cases, such as to enable replacement of individual pens without replacing an entire printbar.

In one example, an inkjet pen 100 may include a plurality of fluid ports, such as a first fluid port 102*a* and a second fluid port 102*b*. The first fluid port 102*a* may be in fluid communication with a regulator 106. As noted above, regulator 106 may refer to a component capable of managing pressure on a fluid line (e.g., the fluid lines illustrated by printing fluid lines 104*a*-104*d*). In one implementation, for instance, regulator 106 may operate by opening a fluidic gate in response to backpressure levels exceeding a threshold (e.g., a negative gauge pressure drops below a threshold valve). By opening the fluidic gate, regulator 106 allows more fluid into the fluid line and decreases the backpressure (e.g., increases the negative gauge pressure with an influx of printing fluid).

Regulator 106 may be in fluid communication with fluid ejection device 105, which may include a number of fluidic dies, and as shall be discussed in further detail hereinafter, the fluidic dies may be supported by a support component. Fluid ejection device 105 may be capable of ejecting printing fluid via nozzles, as illustrated by arrows C. Fluid ejection device 105 may be in fluid communication with a valve 108. Valve 108 may comprise a check valve, which may protect fluid ejection device 105 from printing fluid flowing back via fluid lines 104*c* and 104*d*. Instead, valve 108 may be opened in response to negative pressure applied at second fluid port 102*b* (e.g., via a vacuum pump). By way of further example, a check valve may prevent flow of fluid backwards (e.g., flowing back upstream towards fluid ejection device 105).

As shown, then, an example fluid ejection pen (e.g., inkjet pen 100) may comprise a plurality of fluid ports (e.g., first fluid port 102*a* and second fluid port 102*b*). A first fluid port may deliver printing fluid to a fluid ejection device (e.g., fluid ejection device 105) and a second fluid port may direct printing fluid out of the pen. A pressure regulator (e.g., regulator 106) may be in fluid communication with the first fluid port of the plurality of fluid ports. And a valve (e.g., valve 108) may be in fluid communication with a second port of the plurality of fluid ports. In response to negative pressure, the valve may open to enable fluids within the fluid ejection device to circulate and exit via the second port.

FIG. 1 includes arrows A, B, and C, which illustrate a direction in which printing fluid may flow according to one implementation. For example, printing fluid may flow into pen 100 via first fluid port 102*a*, as demonstrated by arrow A. A portion of the printing fluid may be ejected via fluid ejection device 105, as illustrated by arrows C. Another portion of the printing fluid may be directed out of pen 100 via valve 108 and second port 102*b*, as illustrated by arrow B.

It should apparent from the foregoing description, that it may be possible to modulate a circulation flux. For example, modulation of a positive pressure on first fluid port 102*a* may lead to increases and/or decreases in printing fluid flux entering pen 100 (e.g., directly and/or indirectly). And modulation of a negative pressure on second fluid port 102*b* may lead to increases and/or decrease in printing fluid flux leaving pen 100. Desired circulation flux may therefore be achieved by appropriately setting pressure values at input and output fluid ports (e.g., fluid ports 102*a* and 102*b*).

Figure 2A:
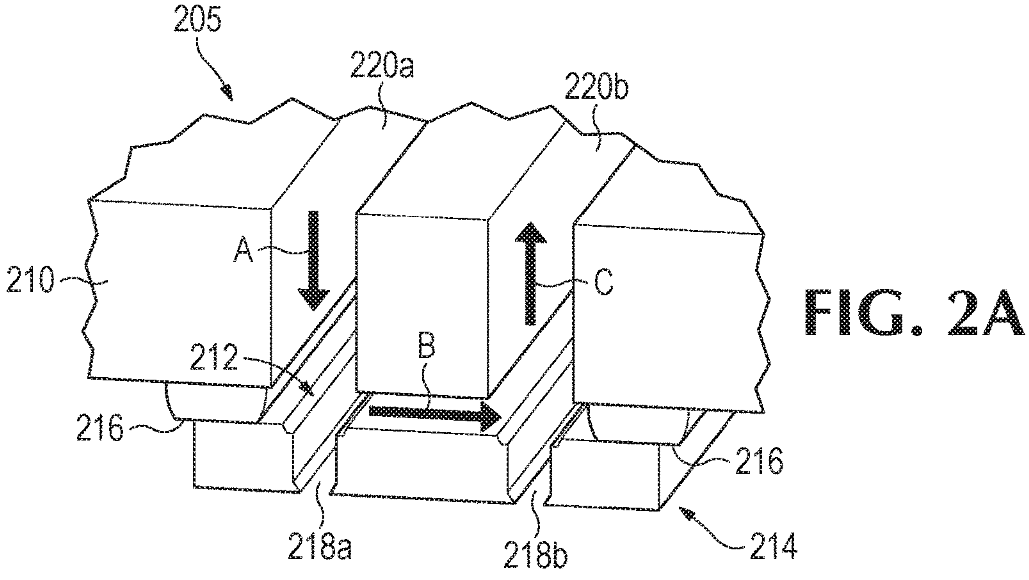
FIGS. 2A and 2B illustrate example fluid ejection devices.
Figure 2B:
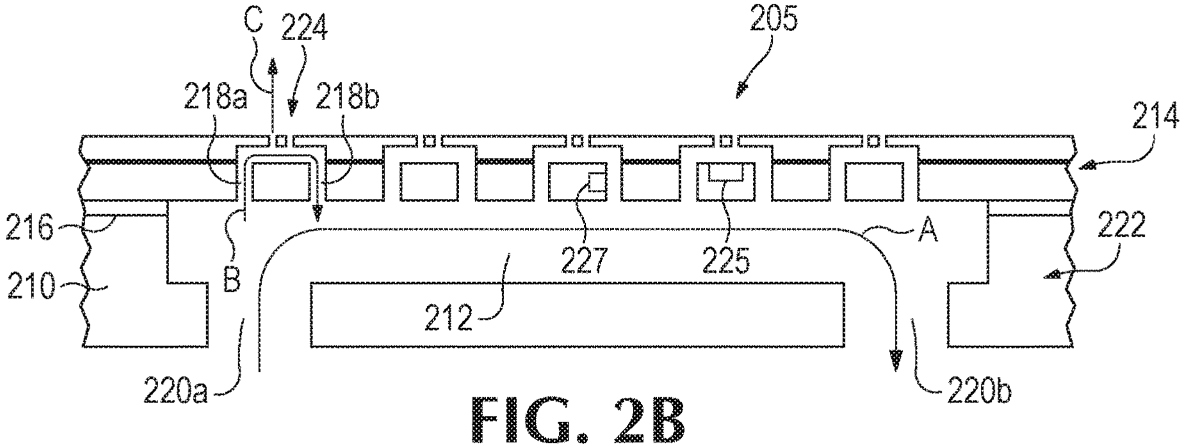

Turning to FIGS. 2A and 2B, example fluid ejection devices 205 are illustrated. These drawings show different components of fluid ejection device 205 in different examples. Fluid ejection devices 205 may be similar in structure and/or operation to fluid ejection device 105 in FIG. 1. It is noted that the present description uses like element numbers to indicate elements and components that may be similar in structure and/or function. For example, an inkjet pen 100 in FIG. 1 may be similar in structure and/or operation to an inkjet pen 400, as shall be discussed hereinafter in relation to FIG. 4. It is noted that portions of the description may refer to structure and/or operation of an implementation. While, in some cases, this discussion may apply to other figures and/or implementations, the reader will understand that this may not always be the case, as the context of the description may make clear.

Returning to FIG. 2A, fluid ejection device 205 includes a support component 210 and a fluidic die 214. Support component 210 comprises a structure, such as a molded structure like a thermoplastic or an epoxy, that provides physical support to fluidic die 214. Support component 210 may be manufactured using a molding process, a machining process, or a layer build-up process, by way of example. Fluid slots 220*a* and 220*b* may carry printing fluids towards and/or away from fluidic die 214. Fluidic die 214 may comprise a semiconductor material and may include a number of layers making up fluid channels and slots (e.g., fluid feed holes 218*a* and 218*b*), ejection chambers, and nozzles (e.g., nozzles 224 in FIG. 2B). Fluidic die 214 may also include ejection components, such as resistive components or piezoelectric membranes, by way of example, that may be activated to eject printing fluid from the nozzles.

There may be a space or gap between support component 210 and fluidic die 214 through which printing fluid may circulate. As illustrated, fluid channel 212 may be defined by a gap in support component 210 and/or a gap in adhesive layer 216. Fluid channel 212 may be used to enable circulation of printing fluid, such as illustrated by arrows A, B, and C, in FIG. 2A.

In operation, an inkjet pen (e.g., inkjet pen 100 of FIG. 1) may include a support component (e.g., support component 210) connected to a fluidic die (e.g., fluidic die 214). A fluid channel (e.g., fluid channel 212) may be arranged in relation to the support component in proximity to a backside of the fluidic die. The backside of the fluidic die refers to the surface of fluidic die between the fluidic die and the support component. As such, in some examples, printing fluid flowing through the fluid channel may flow in contact with the backside of the fluidic die.

As described above, the fluidic die may comprise a plurality of fluid feed holes (e.g., fluid feed holes 218*a* and 218*b*) and the fluid channel is arranged to be in fluid communication with the plurality of fluid feed holes.

Additionally, in some examples, in addition to providing circulation in proximity to the backside of the fluidic die, the fluid ejection device may also provide fluid circulation within microfluidic channels within the die, as shall be illustrated by FIG. 2B.

Turning to FIG. 2B, a fluid ejection device 205 is illustrated with components that are similar to those discussed in relation to FIG. 2A. For example, fluidic die 214 may be similar in structure and/or operation to fluidic die 214 of FIG. 2A, adhesive layer 216 may be similar in structure and/or operation to adhesive layer 216 of FIG. 2A, and support component 210 may be similar in structure and/or operation to support component 210 of FIG. 2A. FIG. 2B also illustrates fluid slots 220*a* and 220*b*, fluid channel 212, and fluid feed holes 218*a* and 218*b*, which are similar in structure and/or operation to those discussed in relation to FIG. 2A. The combination of fluid channel 212, fluid slots 220*a* and 220*b*, and fluid feed holes 218*a* and 218*b* may be referred to collectively as a fluid flow path 222, as illustrated by arrows, A and B. Additionally, fluid may be ejected from nozzles, such as nozzle 224, as illustrated by arrow C. An example ejection component 225 is illustrated in proximity to a different nozzle and is intended to contemplate thermal-based ejection elements, piezo-based ejection elements, and the like. It is to be understood that ejection elements, such as ejection component 225, may be arranged in each ejection chamber from which it may be desired to eject printing fluid.

In contrast to the arrangement of fluid feed holes 218*a* and 218*b* in FIG. 2A, fluid feed holes 218*a* and 218*b* in FIG. 2B are also in fluid communication within fluidic die 214 (e.g., within microchannels). As such, printing fluid may enter an ejection chamber via a first fluid feed hole (e.g., fluid feed hole 218*a*), traverse an ejection chamber, and a portion of the printing fluid that is not ejected may subsequently flow out of the firing chamber and the fluidic die via a second fluid feed hole (e.g., fluid feed hole 218*b*). This fluidic path is illustrated by arrow B. In one implementation, one or more circulation components may be arranged within fluidic die 214 in order to cause printing fluid to enter fluid feed hole 218*a* from fluid channel 212. Additionally (or alternatively), activation of ejection components (e.g., resistive elements) may exert a fluidic pressure within the fluid path illustrated by arrow B to cause fluid (e.g., all or part of the fluid indicated by the arrow A) to enter fluid feed hole 218*a*. Such circulation may be enabled by activation of a circulation component 227, by way of example. Circulation component 227 may comprise a resistive component, such as an embedded resistor, that may generate heat in response to current flow. Activation of circulation component 227 may facilitate fluid circulation, such as illustrated by arrow B. It is noted that while but a single circulation component 227 is illustrated, a number of circulation components may be arranged within other fluid feed holes to facilitate circulation. It may be in some cases that fluid may circulate through individual microchannels, as opposed to circulating through all ejection chambers concurrently. In other implementations, rather than using circulation components 227, due to external pressure (e.g., due to a pump external to fluid ejection device 205), printing fluid may be forced to enter fluid feed hole 218*a*.

As noted above, the combination of a plurality of fluid ports (e.g., fluid ports 102*a* and 102*b* in FIG. 1), a regulator (e.g., regulator 106 in FIG. 1), and a valve (e.g., valve 108 in FIG. 1), in combination with fluid ejection device 205 may enable circulation of printing fluid without a decrease in fluid flux.

In operation, therefore, printing fluid entering fluid ejection device 205 may be caused to be both ejected (in part) and to recirculate (in part). Thus, as shown by arrow A, printing fluid may enter a fluid slot (e.g., fluid slot 220*a*), may travel through a fluid channel 212, and may exit the fluid ejection device via another fluid slot (e.g., second fluid slot 220*b*). A portion of the printing fluid may be ejected from a fluidic die (e.g., fluidic die 214) via a nozzle (e.g., a nozzle 224), as illustrated by arrow C. And another portion of the printing fluid may be caused to circulate away from an ejection chamber and out of fluid ejection device 205 (e.g., as illustrated by the portion of arrow B traversing fluid feed hole 218*b* and the portion of arrow A traversing fluid channel 212 and fluid slot 220*b*). The circulation of printing fluid out of fluid ejection device 205 may be in response to application of a negative pressure, activation of a circulation element, activation of a plurality of ejection elements, or a combination thereof.

The next drawings focus on the support structure that enables flow of printing fluid in proximity to a back surface of a fluidic die.

Figure 3A:
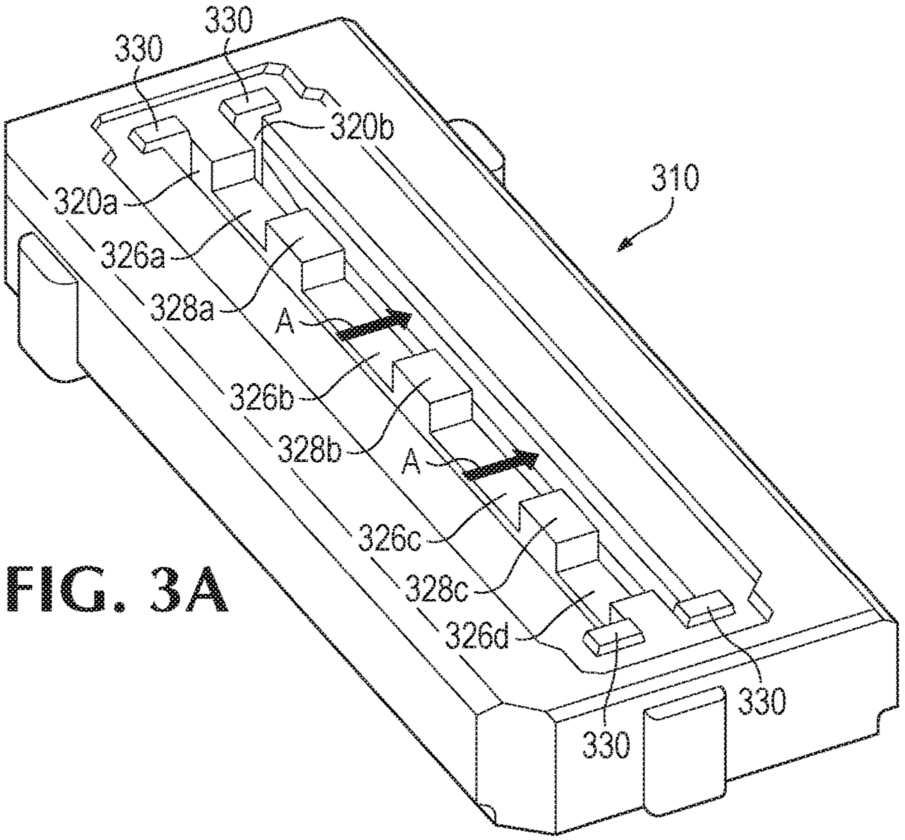
FIGS. 3A and 3B illustrate example support components for fluid ejection devices.
Figure 3B:
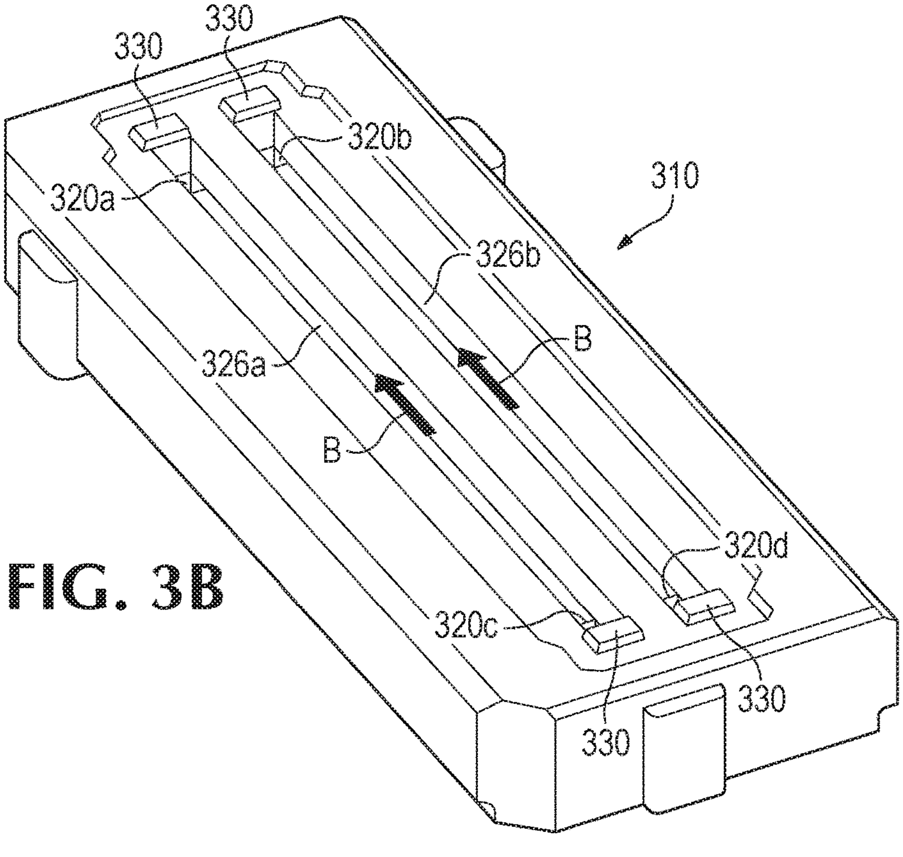

FIG. 3A illustrates an implementation in which fluid channels traverse a width of fluidic dies, while FIG. 3B illustrates an implementation in which fluid channels traverse a length of fluidic dies. FIGS. 3A and 3B may include components similar to those discussed previously. For example, a support component 310 may be similar to support components 210 illustrated in FIGS. 2A and 2B. Likewise fluid slots 320*a* and 320*b* may be similar to fluid slots 220*a* and 220*b* in FIGS. 2A and 2B. Etc.

FIGS. 3A and 3B also show example die supports 330 that may support and/or secure fluidic dies (not shown; see, e.g., fluidic die 214 in FIGS. 2A and 2B) into support component 310 and/or provide protection against potentially damaging contact (e.g., by media, by a service blade, etc.).

Support component 310 may include gaps 326*a*-326*d* within the structure, such as to allow printing fluid to flow from fluid slot 320*a* to fluid slot 320*b*, as illustrated by arrows A. It should be understood that gaps 326*a*-326*d* may correspond to fluid channel 212 in FIG. 2B, by way of example. Additionally, adhesive dots may be applied to support surfaces 328*a*-328*c* to secure the fluidic die to support component 310. In one example, there may be gaps in the adhesive layer corresponding to gaps 326*a*-326*d*. In some cases, a fluid channel (e.g., fluid channel 212 in FIG. 2B) may be formed along a backside of a fluidic die without gaps 326*a*-326*d*. For instance, if a sufficiently thick adhesive layer is applied, gaps in the adhesive layer (e.g., similar to gaps 326*a*-326*d* in support component 310) between adhesive dots may be sufficient to form a fluid channel.

In contrast to FIG. 3A, in which gaps 326*a*-326*d* form fluid channels that extend across a width of the fluidic die, FIG. 3B illustrates an example in which fluid channels are arranged to run lengthwise across a back surface of the fluidic die.

FIG. 3B illustrates components that are similar to those discussed in FIG. 3A, including support component 310, fluid slots 320*a-d*, gaps 326*a* and 326*b*, and die supports 330. Nevertheless, gaps 326*a* and 326*d* are arranged with respect to fluidic dies such that printing fluid will enter gaps 326*a* and 326*b* (corresponding to, for instance, fluid channel 212 of FIGS. 2A and 2B) by fluid slots 320*c* and 320*d*. The printing fluid will traverse the length of the backside of the fluidic die, and will exit gaps 326*a* and 326*b* via fluid slots 320*a* and 320*b*. In some implementations, more than one pair of input and output ports (e.g., fluid slots 320*a* and 320*c*) may be formed within a gap (e.g., gap 326*a*). For instance, along one channel defined by a gap, there may be a first input port followed by a first output port, then a second input port followed by a second output port, etc. Such an implementation may be desirable to reduce a pressure drop along the length of the fluid channel defined by the gap in support component 310.

Figure 4:
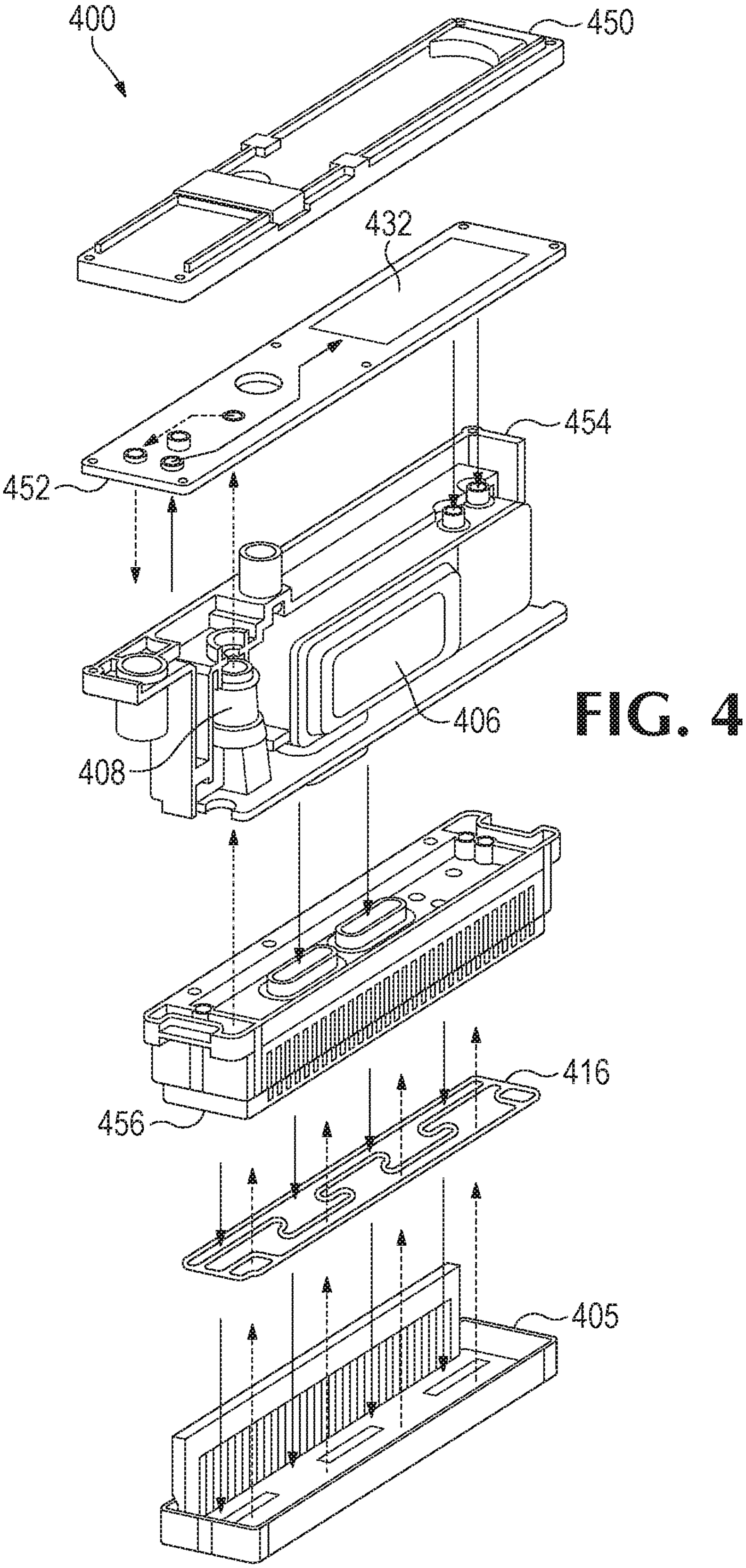
FIG. 4 is an exploded view of an example fluid ejection pen.

The next drawing, FIG. 4, illustrates an example fluid pen, including those structures discussed above, in relation to FIGS. 1-3B.

FIG. 4 illustrates an inkjet pen 400 and illustrates a flow of printing fluid in through a first fluid port and out of a second fluid port (e.g., fluid ports 102*a* and 102*b* in FIG. 1), where fluid flow out of pen 400 is illustrated by broken arrows and fluid flow into pen 400 is illustrated by solid arrows. A cap 450 refers to a structural component to enclose a top portion of pen 400, and may be in a suitable material including, but not limited to, thermoplastics. A filter 432 may be arranged in a fluidic plate 452 designed to facilitate directing fluid flow into and out of pen 400. For example, due, among other things, to recirculation of printing fluid, colorants may stick together and increase in size. Additionally, dust and debris may accumulate within circulating printing fluids. In such cases, filter 432, which may comprise a screen or a membrane, byway of non-limiting example, and may remove the undesirable particles (e.g., colorants, debris, etc.) from the printing fluid. Suitable materials for fluidic plate 452 may include thermoplastics, ceramics, glass, and metals, byway of non-limiting example. In one example, valve 408 and regulator 406 may be arranged within a body 454; valve 408 may enable flow of printing fluid out of pen 400; and regulator 406 may maintain flux for printing fluid entering fluid ejection device 405. A carrier 456 may act as a support structure, such as including support compound 210 discussed above in FIGS. 2A and 2B. Carrier 456 may include other components, including a fluid fan-out manifold, by way of non-limiting example. An adhesive layer 416 is illustrated as by connect carrier 456 to fluid ejection device 405.

It is noted that in one implementation, one pen 400 may house a fluid line and supporting components (such as a filter, a pressure regulator, a check valve, etc.) for a single color printing fluid (e.g., black). Additional pens may be used to support fluid lines for additional colors of printing fluid (e.g., cyan, magenta, yellow, white, etc.).

The next two drawings (and associated description) will discuss how the elements of FIGS. 2A, 2B, 3A, 3B, and 4 may operate together in order to enable fluid circulation within a pen while the pen is active (e.g., ejecting fluid) without reductions in printing fluid flux.

Figure 5A:
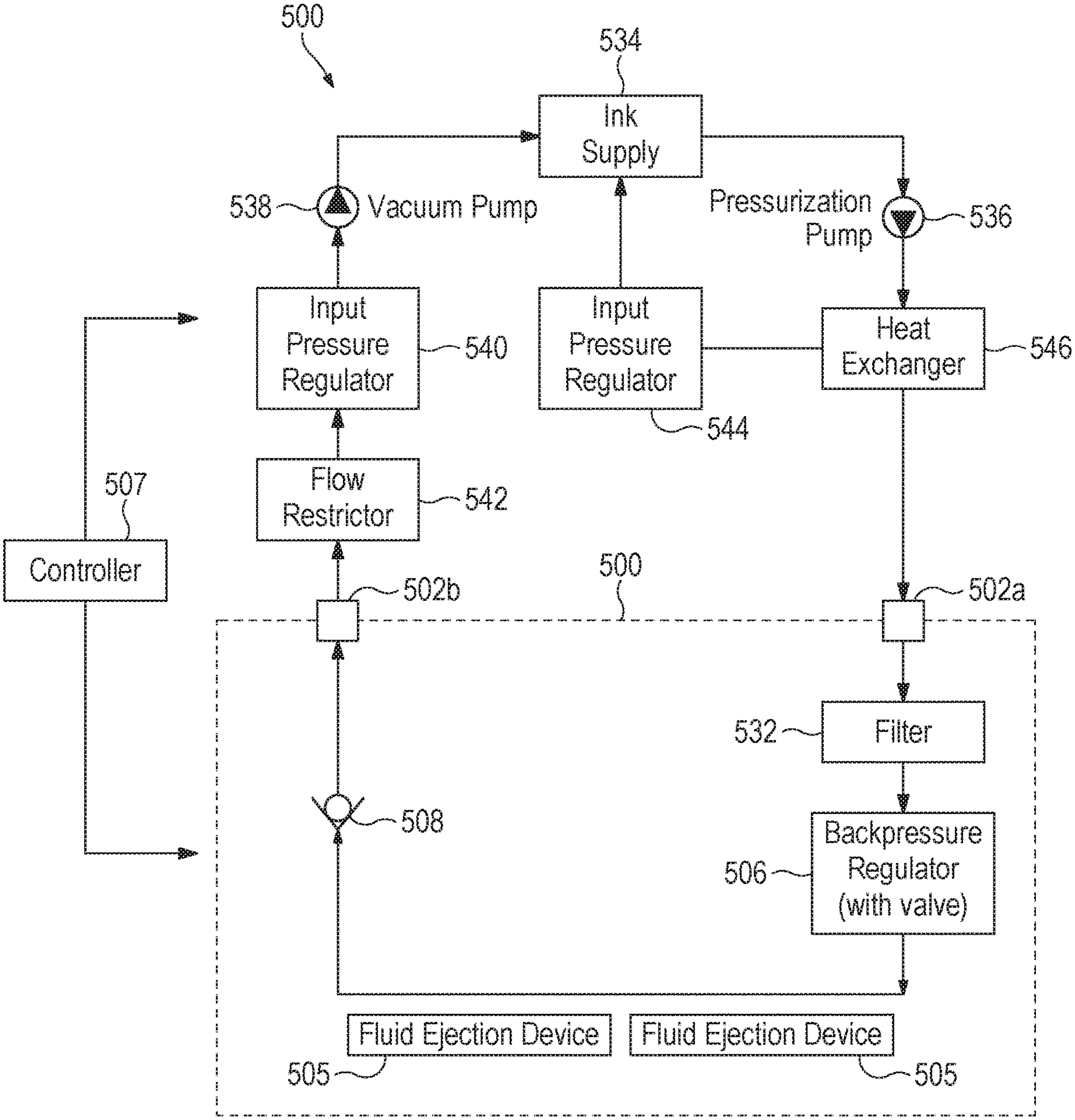
FIGS. 5A and 5B illustrate example printing fluid delivery systems.
Figure 5B:
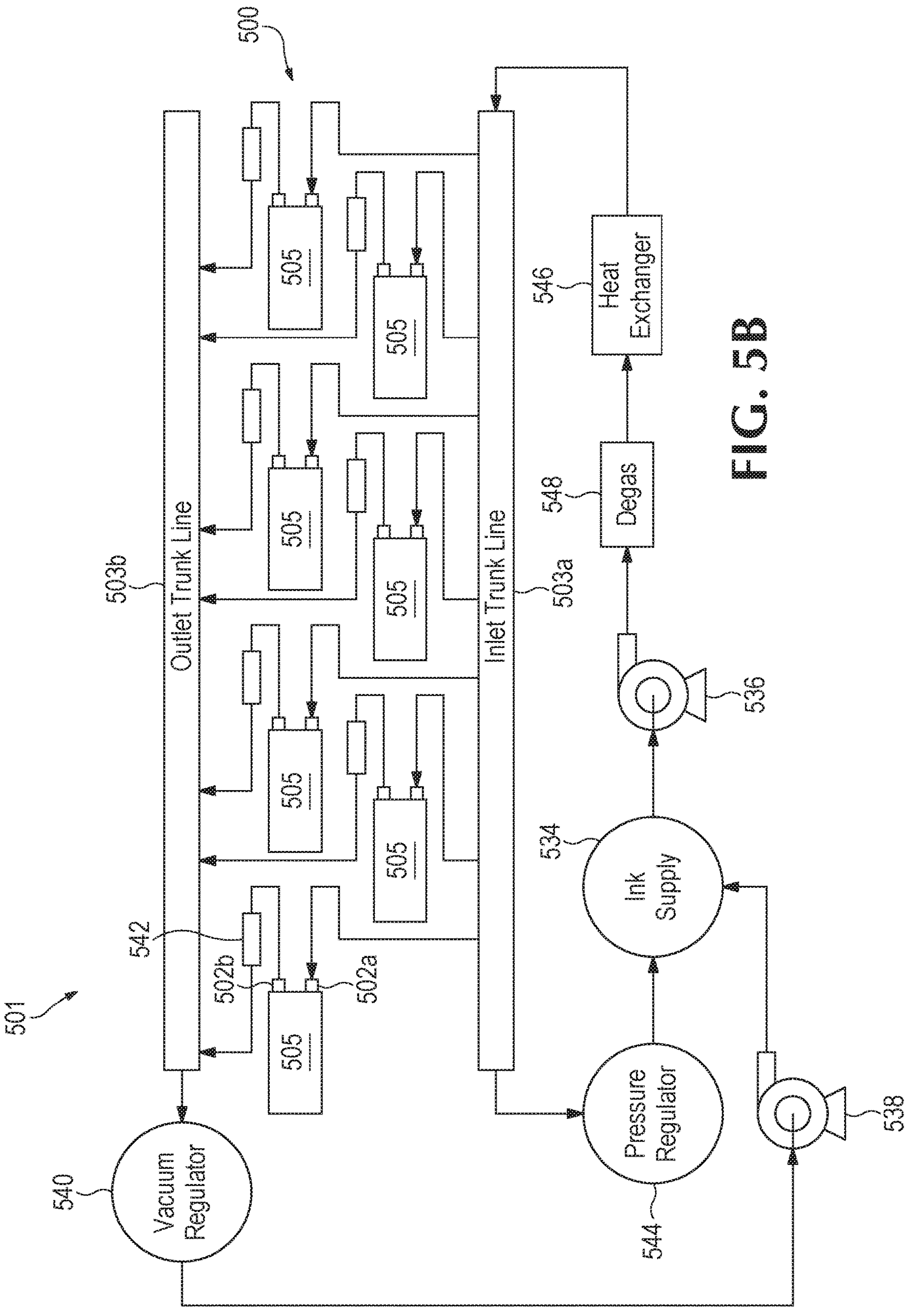

FIGS. 5A and 5B illustrate example printing fluid delivery systems 501 configured to enable circulation of printing fluid, such as across a backside of a fluidic die, without a reduction in flux, such as using an inkjet pen 500, similar in structure and/or operation to inkjet pen 100 in FIG. 1. Fluid ejection devices 505 may be similar in function and/or operation to fluid ejection device 105 in FIG. 1 and fluid ejection devices 205 in FIGS. 2A and 2B. Regulator 506 may be similar in structure and/or operation to regulator 106 in FIG. 1. And valve 508 may be similar in structure and/or operation to valve 108 in FIG. 1.

FIG. 5A also illustrates a filter 532, a printing fluid supply 534, a pump 536 (e.g., for pressurization at a first port), a pump 538 (e.g., for creating a vacuum at a second port), a pressure regulator 540, a flow restrictor 542, an input pressure regulator 544, and a thermal regulating component 546. A controller 507 may be in communication (e.g., via electrical signals exchanged) with components of printing fluid delivery system 501.

In one implementation, printing fluid supply 534 refers to a reservoir capable of receiving, storing, and releasing printing fluid. In one example, for instance, printing fluid may exit printing fluid supply 534 and may traverse fluid supply lines towards pen 500. Printing fluid that is not ejected by pen 500 may be recirculated back to printing fluid supply 534, as illustrated.

Pump 536 may be capable of applying a positive pressure on a fluid supply line, such as to cause printing fluid to flow towards pen 500. Pump 536 may take any suitable form including electromechanical and solid-state pumps, by way of non-limiting example.

In one implementation, a sub loop through input pressure regulator 544 may be used to help maintain constant input pressure at fluid port 502*a*. For instance, as flux changes within pen 500 (e.g., due to pressure changes on a fluid line due to changes in drop ejection flux), input pressure regulator 544 may comprise a gate to dynamically open and/or close based on pressure on a fluid line after pump 536.

Thermal regulating component 546 refers to components capable of heating and/or chilling printing fluid prior to transmission thereof to pen 500. For example, there may be a desire, such as when a printing device is first turned on, to heat a fluidic die, such as to enable desirable operational parameters. Heating of printing fluid may also be desirable in order to reduce printing fluid viscosity. Similarly, at times there may be an interest in chilling a print head. For instance, at times a fluidic die may have portions that are exceeding a desired temperature. Additionally, in some cases there may be a desire to increase a viscosity of a printing fluid. Thus, in such cases, there may be a desire to transmit chilled printing fluid to pen 500. As should be appreciated, a thermal regulating component 546 may be desirable to yield a desired print quality (PQ).

After pressurization by pump 536 and/or traversing thermal regulating component 546, printing fluid may enter pen 500 via a first fluid port 502*a*, similar to as has been discussed above. Printing fluid may flow through filter 532 in order to remove any solids or debris exceeding a desired size, as discussed above. As should be apparent, then, in one case, a filter (e.g., filter 532) may be in fluid communication with a pressure regulator (e.g., regulator 506).

A portion of the printing fluid may be ejected via fluid ejection devices 505, as discussed above, and may be allowed to flow out of fluid port 502*b* as valve 508 is opened, such as in response to application of a negative pressure. In one example, negative pressure may be applied to valve 508 by pump 538. Pump 538 may comprise any suitable form of electromechanical or solid-state component (among other things) capable of applying a negative pressure on fluid port 502*b*. Flow restrictor 542 and regulator 540 may work in concert to ensure that a vacuum pressure does not exceed an acceptable threshold at port 502*b* analogously to the operation of regulator 506 and input pressure regulator 544. For example, if excessive pressure were to be applied by pump 538, a flux of printing fluid may exceed a threshold for providing acceptable pressure to fluid ejection devices 505. And flow restrictor 542 and regulator 540 may reduce such an occurrence.

It should be understood that controller 507 may be capable of enabling the operation of components, as discussed above, such as by transmitting signals to a desired component, such as via an electrical contact of a pen. Once received by the pen, the signals may be transmitted to enable operation, such as discussed above (e.g., causing ejection of printing fluid from a fluid ejection device).

FIG. 5B includes components similar in structure and/or operation to those discussed in FIG. 5A. For instance, FIG. 5B illustrates an inkjet pen 500, in fluid communication with a printing fluid supply 534, a pump 536, a thermal regulating component 546, a pressure regulator 544, a vacuum regulator 540, and a vacuum pump 538. FIG. 5B also illustrates a degas component 548, capable of removing gasses from printing fluid, such as by allowing air bubbles to separate from the fluid and be vented elsewhere. FIG. 5B also shows an inlet trunk line 503*a* through which printing fluid flows, after being pumped from pump 536. Printing fluid enters a number of fluid ejection devices 505 for ejection via fluidic lines and a first fluid port 502*a*. Printing fluid that is not ejected by fluid ejection devices 505 may be recirculated back towards printing fluid supply 534 via second fluid port 502*b*, may traverse a flow restrictor 542, and be directed to another fluid trunk line, this time an outlet trunk line 503*b*. As described, above, a valve in fluid ejection devices 505 may enable flow of printing fluid out of second fluid port 502, even while printing, without a reduction in flux.

Figure 6:
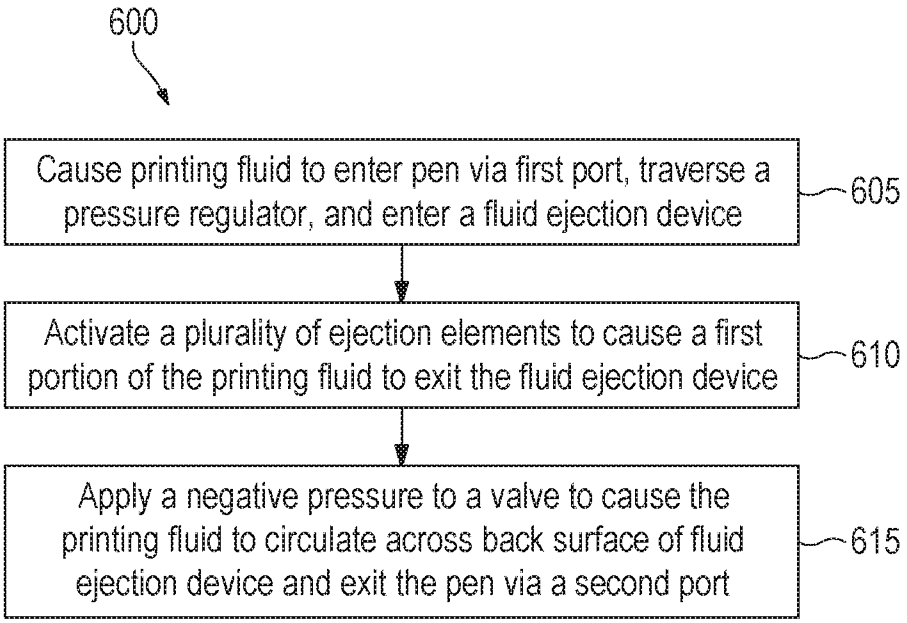
FIG. 6 is a flow diagram illustrating an example method for circulating printing fluid within a pen.

FIG. 6 illustrates a method 600 including blocks 605, 610, and 615. At block 605, a printing fluid is caused to enter a pen (e.g., pen 500 of FIG. 5A) via a first port (e.g., fluid port 502*a* of FIG. 5A). As noted above, fluid flow may be engendered responsive to operation of a pump, activation of ejection components, and activation of circulation components, by way of non-limiting example. Returning to example method 600, the printing fluid is to traverse a pressure regulator (e.g., regulator 506 of FIG. 5A) and enter a fluid ejection device (e.g., fluid ejection device 505).

At block 610, a plurality of ejection elements are activated in the fluid ejection device to cause a first portion of the printing fluid to exit the fluid ejection device (see, e.g., arrow C in FIG. 2B).

At block 615, a negative pressure is applied to a valve (e.g., valve 508 in FIG. 5A) in fluid communication with a second port (e.g., second fluid port 502*b* in FIG. 5A) of the pen to cause a second portion of the printing fluid to circulate across the back surface of the fluid ejection device (see, e.g., a second portion of arrow A in FIG. 28) and to exit the pen while the plurality of ejection elements are being activated.

As should be apparent from the foregoing, the present disclosure proposes an approach for circulating fluid (e.g., behind a fluidic die) within a printing fluid ejection pen, while the pen is active (e.g., ejecting fluid) without drops in printing fluid flux.

As mentioned previously, in order to reduce clumping, drying, settling, creaming, or to otherwise keep fluid with suspended solids "fresh," some printing devices may recirculate unused printing fluid. In one process sometimes referred to as "micro-recirculation," the fluid may be recirculated within fluid ejection devices, e.g., within die recirculation channels. In another process sometimes referred to as "macro-recirculation," the fluid may be recirculated from within the fluid ejection devices to point(s) outside of the fluid ejection devices.

Some fluid ejection pens (e.g., 100 in FIG. 1) may include multiple ports 102*a*, 102*b*. In some scenarios, some of these ports may be used to deliver fluid to multiple integral fluid ejection devices 105, such as fluidic die (e.g., if valve 108 is replaced with another pressure regulator). In some instances, the same fluid (e.g., the same color) may be delivered to both ports 102*a*, 102*b* in order to increase flow rate and, hence, to increase printing speed. However, if macro-recirculation is desired, one of the ports, e.g., 102*b*, may be used as an outlet or recirculation port to direct fluid out of the pen 100 to keep that fluid fresh, to prevent clumping/drying, etc. However, doing so surrenders some flow rate, which may run counter to the goal of high speed printing.

Accordingly, examples are described herein for increasing the flow rate for a multi-port fluid ejection pen for which one port is being used for macro-recirculation. In some such examples, an inlet port such as 102*a* used to direct fluid into the pen, e.g., from an outside fluid reservoir (e.g., ink supply 534), may be fluidly coupled with multiple pressure regulators in parallel, so that the fluid fed through the inlet port is directed in parallel through each of the multiple fluid regulators. This enables an increase in flow rate over what a single pressure regulator of the same size can achieve alone.

In some examples, a filter may be fluidly coupled with the multiple parallel pressure regulators. This filter may be deployed at various locations relative to the pressure regulators, such as between the inlet port and the multiple pressure regulators, or between the multiple pressure regulators and downstream fluid ejection device(s) such as fluid ejection die. In some circumstances, the former may allow for a greater flow rate—and hence, greater print speed—than the latter.

Figure 7:
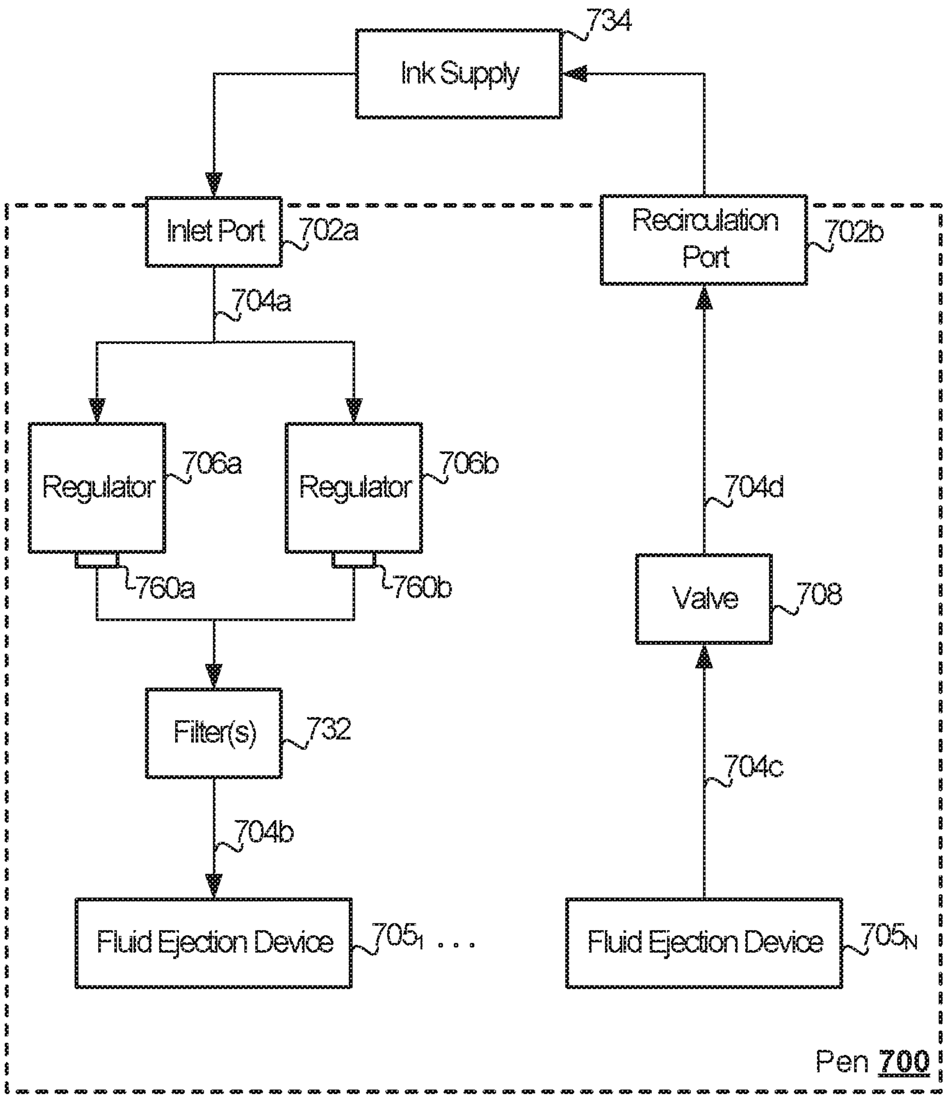
FIG. 7 schematically illustrates another example of a printing fluid ejection pen.

Referring now to FIG. 7, an example pen 700 configured with selected aspects of the present disclosure is depicted schematically. Pen 700 and its constituent components may share various characteristics with similarly-numbered components of pen 100 in FIG. 1, and/or with similarly-numbered components of pen 500 depicted in FIG. 5.

Pen 700 may receive fluid such as printing ink from printing supply reservoir such as an ink supply 734. This fluid may be directed by inlet port 702*a* (which may share various characteristics with port 102*a* in FIG. 1) generally towards any number of fluid ejection devices $\mathbf{705}_{1\text{-}N}$. Before the fluid from inlet port 702*a* arrives at fluid ejection devices $\mathbf{705}_{1\text{-}N}$, the fluid may pass through multiple pressure regulators 706*a*, 706*b* in parallel (collectively, regulators 706). For example, fluid may pass from inlet port 702*a* through fluid line 704*a*, which splits into two branches, each feeding a respective regulator 706. This fluid may then be passed through some number of filters 732 and fluid line 704*b* to fluid ejection devices $\mathbf{705}_{1\text{-}N}$.

In FIG. 7, two parallel pressure regulators 706*a* and 706*b* are provided, but in other examples, other numbers of parallel pressure regulators 706 may be provided. In sum, in various examples, one fluid (e.g., of a particular color) that enters pen 700 through inlet port 702*a* may be directed through multiple pressure regulators 706 in parallel. By increasing the number of parallel pressure regulators it is possible to increase the flow rate over what would be available with a single pressure regulator.

Sudden changes in fluid momentum within pen 700 may have deleterious effects on print quality and/or other aspects of operation of pen 700. For example, an abrupt change in fluid momentum may cause hydraulic shock, which is also referred to as the "fluid hammer" or "water hammer" effect. Left unchecked, acoustic waves caused by this shock may impact print quality. Accordingly, in some examples, aspect(s) of various components may be designed to reduce an impact of hydraulic shock, e.g., by dampening, absorbing, or otherwise reshaping or diffusing the acoustic waves.

In FIG. 7, each pressure regulator 706 includes a corresponding regulator exit port 760. For example, first pressure regulator 706*a* includes a first regulator exit port 760*a*, and second pressure regulator 706*b* includes a second regulator exit port 760*b*. In some examples, exit ports 760*a*, 760*b* may be sized and/or shaped in various ways in order to address and/or mitigate impacts of hydraulic shock. For example, exit ports 760*a*, 760*b* may be designed with oblong shapes to enable acoustic energy created by a change in momentum of the fluid within pen 700 to pass to, and be remediated at, locations such as within pressure regulators 706*a*, 706*b*. Specific but non-limiting examples of how exit ports 760*a*, 760*b* may be sized and/or shaped will be described with respect to FIGS. 9A-B and 10.

Fluid that is not ejected from fluid ejection devices $\mathbf{705}_{1\text{-}N}$ may be recirculated through a recirculation port 702*b*, e.g., back towards ink supply 734 in a process of macro-recirculation. As described previously, in some examples, this may be accomplished using a valve such as a check valve 708. Check valve 708 may protect fluid ejection device(s) $\mathbf{705}_{1\text{-}N}$ from printing fluid flowing back via fluid lines 704*c* and 704*d*. Instead, in some examples, valve 708 may be opened in response to negative pressure applied at recirculation port 702*b* (e.g., via a vacuum pump). By way of further example, a check valve may prevent flow of fluid backwards (e.g., flowing back upstream towards fluid ejection devices $\mathbf{705}_{1\text{-}N}$).

In FIG. 7, some number of filter(s) 732 are fluidly coupled downstream from pressure regulators 706*a* and 706*b*, between pressure regulators 705*a*, 705*b* and fluid ejection devices $\mathbf{705}_{1\text{-}N}$. As described previously, each filter 732 may comprise a screen or a membrane, byway of non-limiting example, and may remove undesirable particles such as colorants, debris, etc., from the fluid. However, filter(s) 732 may also introduce some amount of loss in fluid pressure. Consequently, filter(s) 732—in the relative position(s) depicted in FIG. 7—may contribute to pressure changes that impact print quality, and may also limit overall print speed.

Figure 8:
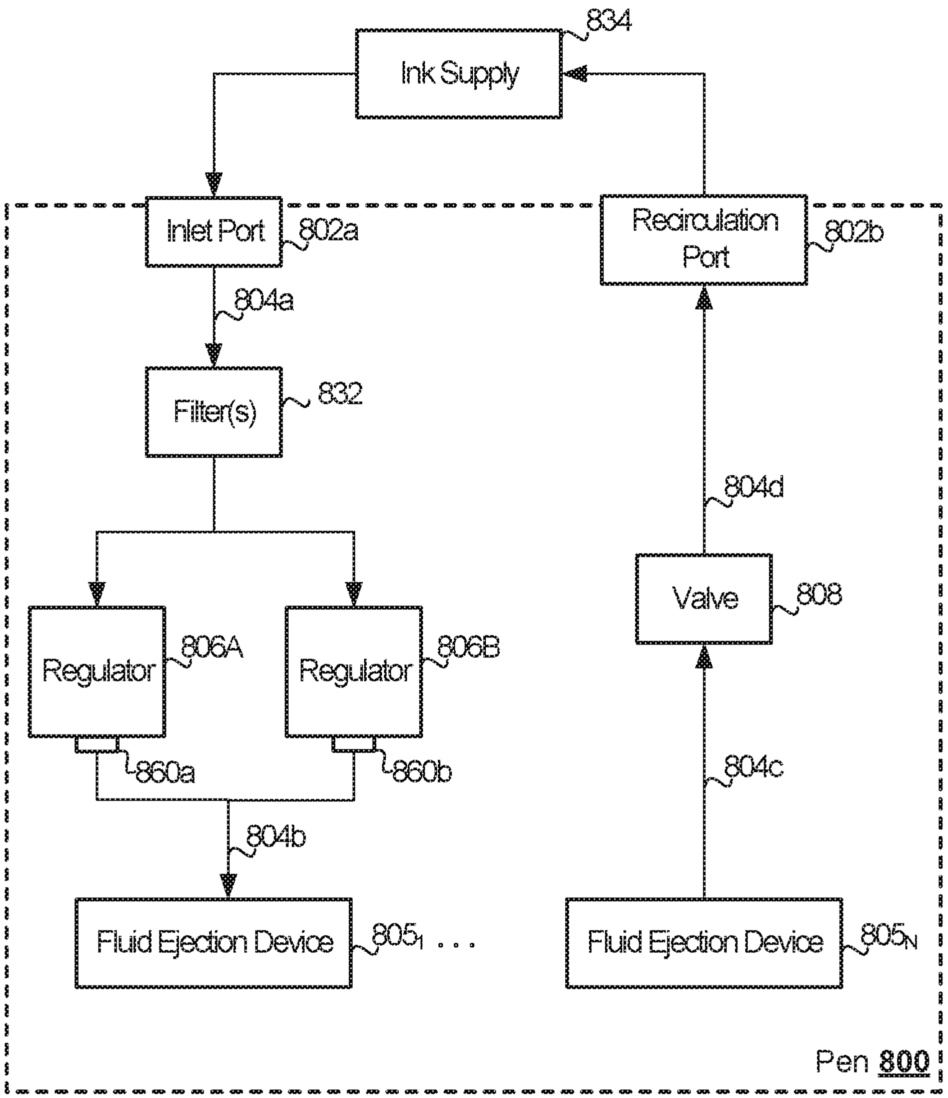
FIG. 8 schematically illustrates another example of a printing fluid ejection pen.

Accordingly, FIG. 8 depicts an example pen 800 that includes components similar to FIG. 7, including inlet port 802*a*, recirculation port 802*b*, fluid lines 804*a-d*, fluid ejection devices $\mathbf{805}_{1\text{-}N}$, regulators 806*a*, 806*b*, valve 808, and filter(s) 832, but that facilitates higher speed printing. Pen is also fluidly coupled with a printing supply reservoir such as an ink supply 834. In particular, pen 800 includes filter(s) 832 at a different location than in FIG. 7, namely, upstream of parallel pressure regulators 806*a*, 806*b*, in between inlet port 802*a* and parallel pressure regulators 806*a*, 806*b*. Locating filter(s) 832 at this location, as opposed to downstream of the parallel pressure regulators 706*a*, 706*b* as was depicted in FIG. 7, enables an increased flow rate over what was possible with pen 700 of FIG. 7.

As noted previously, locating filter(s) 732 at the position shown in FIG. 7 may introduce a pressure drop between pressure regulators 706*a*, 706*b* and fluid ejection devices $\mathbf{705}_{1\text{-}N}$, especially as filter(s) 732 become clogged. This may affect pressure available at nozzles of fluid ejection device(s) $\mathbf{705}_{1\text{-}N}$, and hence, print quality.

By contrast, if filter 832 is placed upstream of regulators 806*a*, 806*b*, as shown in FIG. 8, and there are no substantial restrictions between regulators 806*a*, 806*b* and fluid ejection devices $\mathbf{805}_{1\text{-}N}$, then regulators 806*a*, 806*b* are able to directly control the pressure at the nozzles of fluid ejection devices $\mathbf{805}_{1\text{-}N}$. In addition, with the upstream filter placement of FIG. 8, upstream pressure provided by, for instance, a pump (not depicted) can be controlled to push fluid such as ink across filter(s) 832, thereby avoiding use of any component of pen 800 from pulling fluid across filter(s) 832. This allows more pressure loss through pressure regulators 806*a*, 806*b* before an overall pen limit is reached.

Figure 9A:
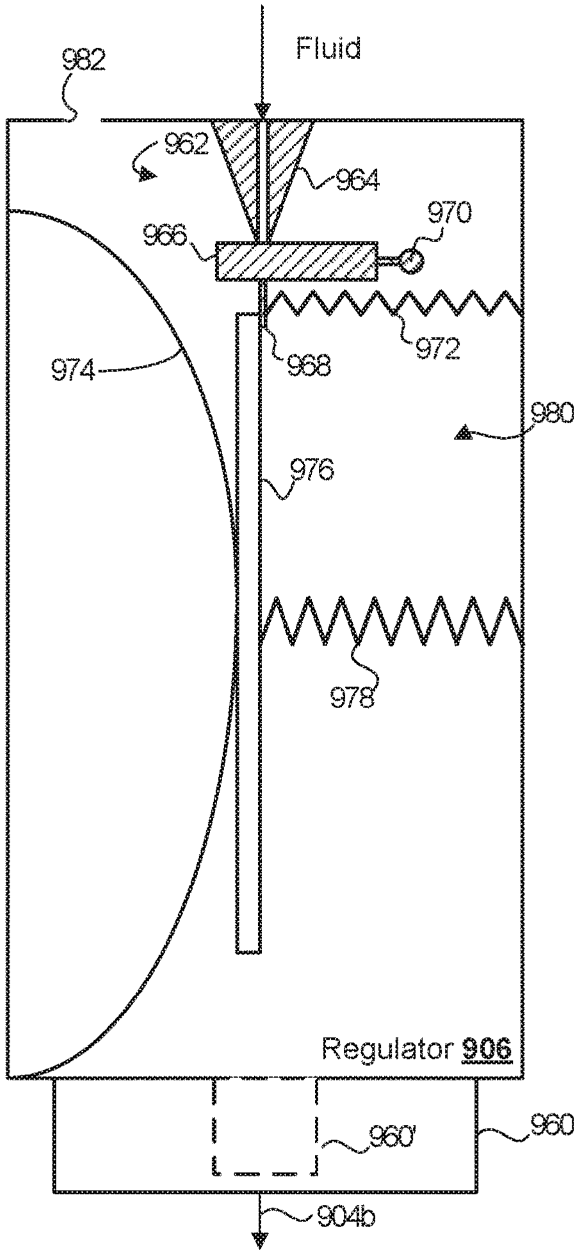
FIGS. 9A and 9B schematically depict an example pressure regulator configured with selected aspects of the present disclosure.
Figure 9B:
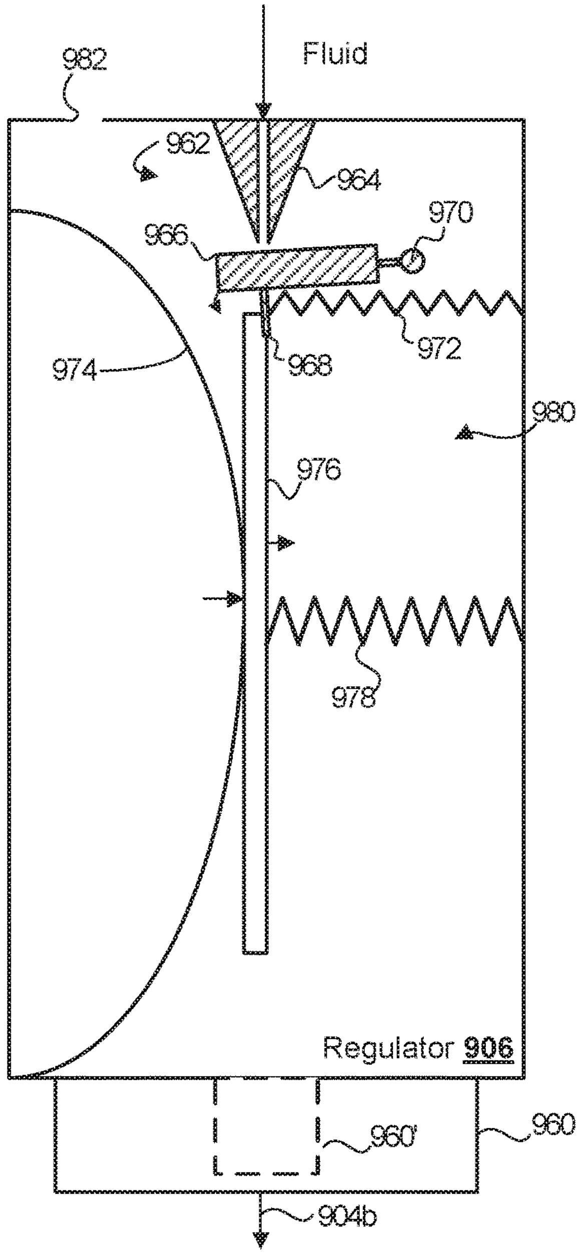

FIGS. 9A and 9B schematically depict one example of how a pressure regulator 906 configured with selected aspects of the present disclosure may mitigate negative effects of hydraulic shock. Various pressure regulators described herein, such as 106, 506, 706, and 806, may or may not share various characteristics with pressure regulator 906. FIG. 9A depicts pressure regulator 906 in a first state that may correspond to a nominal state, or a set point, at which fluid contained within a fluid chamber 980 has no momentum. FIG. 9B depicts pressure regulator 906 in a second state in which fluid has exited fluid chamber 980, and consequently, new fluid is being drawn into fluid chamber 980 of pressure regulator 906.

Pressure regulator 906 includes a valve assembly 962 to control when fluid enters fluid chamber 980. Valve assembly 962 includes an inlet port 964 that is selectively blocked or not blocked by a blocking member 966. Blocking member 966 includes a stem 968 or extension in FIGS. 9A-B, but other configurations are possible. Stem 968 is maintained at its nominal or set point position depicted in FIG. 9A by a valve spring 972.

Blocking member 966 pivots or rotates about a pivot point 970 between the two states depicted in FIGS. 9A and 9B. In FIG. 9A, blocking member 966 is not pivoted and blocks inlet port 964. In FIG. 96, blocking member 966 has been pivoted slightly counter-clockwise (and against the bias provided by valve spring 972) about pivot point 970 to create a small gap between blocking member 966 and inlet port 964, thereby allowing fluid to enter into fluid chamber 980.

A compliant member 974 is provided to be responsive to changes in internal pressure within fluid chamber 980. Compliant member 974 may be constructed with a flexible and/or stretchable material such as rubber, such that it acts as a flexible film or diaphragm. Compliant member 974 may expand, stretch, retract, etc. in response to a pressure change within chamber 980. For example, in response to a reduction in pressure, compliant member 974 may expand to urge a plate 976 against bias provided by a plate spring 978 towards stem 968 (rightward in FIGS. 9A-B). This in turn urges stem 968 against the bias provided by valve spring 972. As shown in FIG. 9B, doing so may allow new fluid to enter fluid chamber 980. Thus, for instance, as fluid exits pressure regulator 906 via exit port 960 to fluid line 904*b* as part of the printing process, negative pressure is created within chamber 980. This negative pressure causes compliant member 974 to urge plate 976 towards stem 968 as described above and as shown in FIG. 9B. In some examples, regulator 906 includes a body vent 9 to enable passage of, for instance, gas.

In addition to providing a mechanism for moving fluid as described above, in some examples, compliant member 974 may be leveraged to mitigate against the effects of hydraulic shock. To this end, in some examples, exit port 960 of regulator 906 may be sized and/or shaped to allow acoustic waves caused by a sudden or abrupt change in fluid momentum to pass into fluid chamber 980 of regulator 906, so that compliant member 974 can absorb, dampen, or otherwise remediate against these acoustic waves.

In FIGS. 9A and 9B, an example exit port 960' that is not specifically sized and/or shaped to enable passage of acoustic waves is depicted in dashed lines. As depicted, exit port 960' may be smaller than exit port 960. The smaller size and/or shape (e.g., circular) of exit port 960' may not allow acoustic waves to pass into fluid chamber 980, or at least may not allow sufficient acoustic waves to pass into fluid chamber 980. Consequently, compliant member 974 is unable to dampen and/or absorb those waves, and they are free to cause the deleterious effects described previously.

By contrast, exit port 960 is sized and/or shaped in accordance with examples described herein—e.g., larger than exit port 960' as shown in FIGS. 9A-B—to permit acoustic waves caused by sudden fluid momentum change to enter fluid chamber 980 and be dampened/absorbed by compliant member 974. Additionally, exit port 960 may be shaped in various ways to impact acoustic waves.

Figure 10:
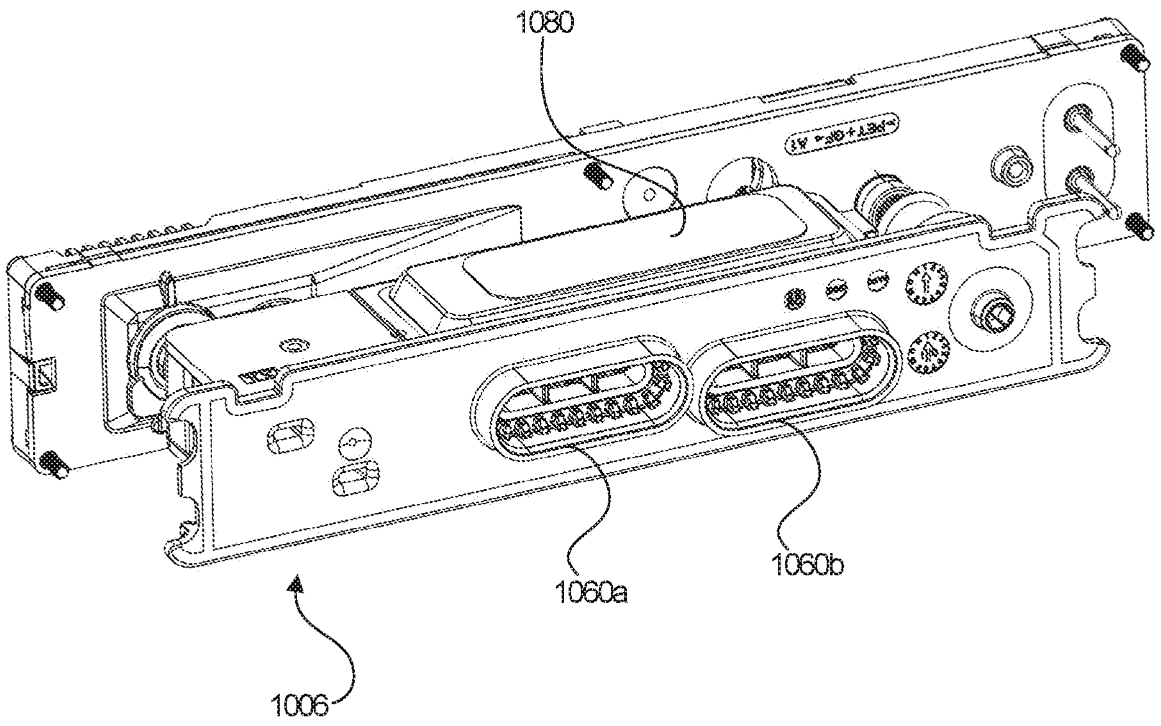
FIG. 10 is a perspective view of a pressure regulator assembly configured with selected aspects of the present disclosure.

FIG. 10 depicts one example of a pressure regulator assembly 1006 that may share various characteristics with, for instance, regulator 406 of FIG. 4. Pressure regulator assembly 1006 may include exit ports 1060*a*, 1060*b* (sharing characteristics with exit ports 760*a*/760*b*, 860*a*/860*b*, 960) that are shaped in accordance with examples described herein. In this example, fluid exits pressure regulator assembly 1006 (which while not shown may include multiple internal pressure regulators in parallel) via exit ports 1060*a*, 1060*b*. At the same time, exit ports 1060*a*, 1060*b* have oblong shapes that enable acoustic waves caused by hydraulic shock to pass into fluid chamber 1080, so that compliant member(s) (not depicted in FIG. 10, 974 in FIGS. 9A-B) may dampen and/or absorb them as described previously. In FIG. 10, exit ports 1060*a*, 1060*b* have "racetrack" shapes, but this is not meant to be limiting. Other oblong shapes, including but not limited to oblong rectangles, ovals, etc., may also be employed. These oblong shapes may disrupt, diffuse, and/or reshape acoustic waves better than, for instance, circular-shaped exit ports.

Figure 11:
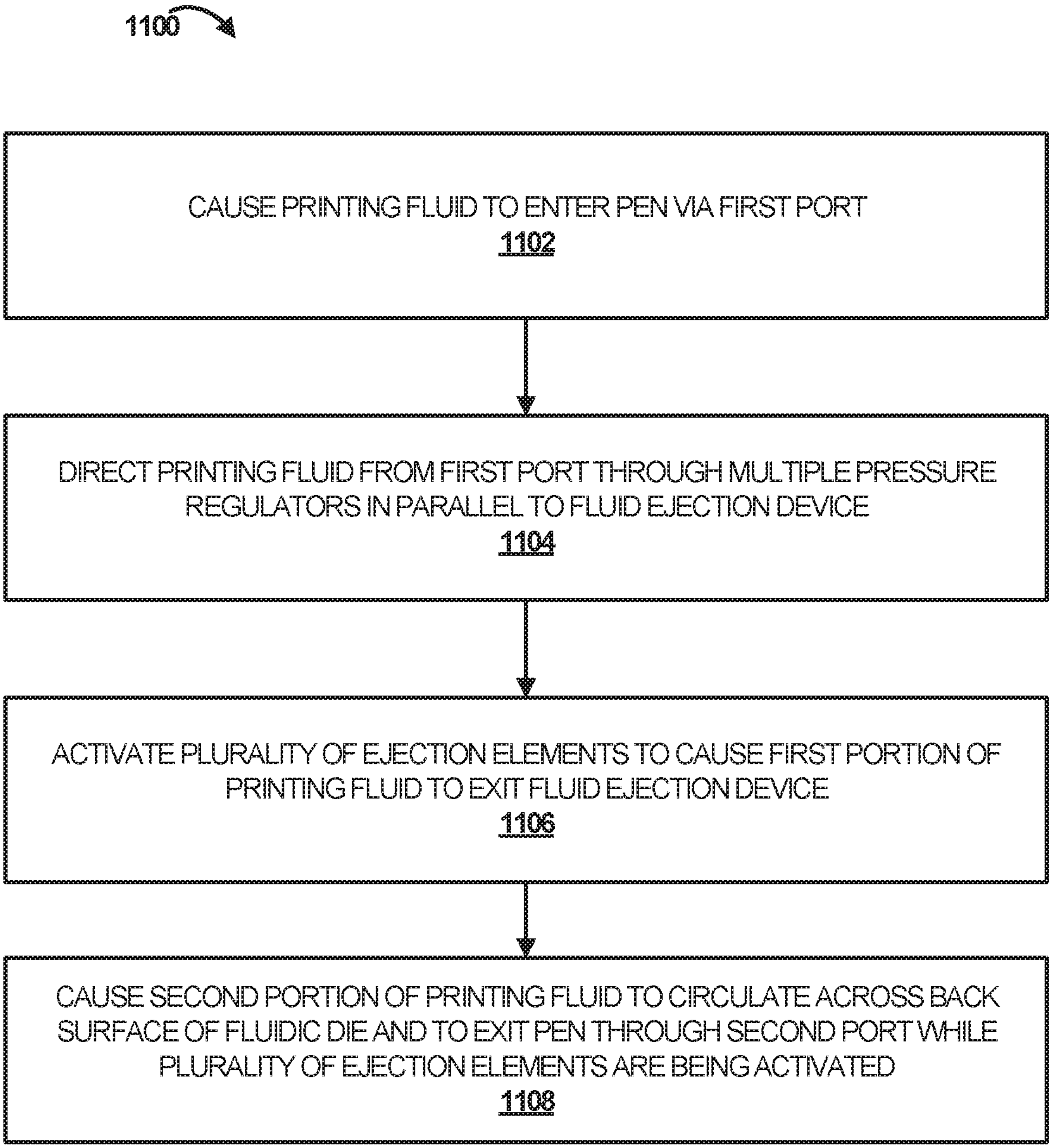
FIG. 11 is a flow diagram illustrating another example method for circulating printing fluid within a pen.

FIG. 11 illustrates a method 1100 of causing printing fluids to circulate across a back surface of a fluid ejection device within an inkjet pen. Method 1100 includes blocks 1102, 1104, 1106, and 1108.

At block 1102, printing fluid may be caused to enter an inkjet pen (e.g., 100, 700, 800) via a first port (e.g., 102*a*, 702*a*, 802*a*). At block 1104, the printing fluid may be directed from the first port through multiple pressure regulators (e.g., 706*a*/706*b*, 806*a*/806*b*, 906) in parallel to a fluid ejection device (e.g., $\mathbf{705}_{1\text{-}N}$, $\mathbf{806}_{1\text{-}N}$).

At block 1106, a plurality of ejection elements (e.g., 225) may be activated in the fluid ejection device to cause a first portion of the printing fluid to exit the fluid ejection device, e.g., to be printed or otherwise deposited onto a medium. At block 1108, a second portion of the printing fluid may be caused to circulate across the back surface of a fluidic die (e.g., 214) of the fluid ejection device, and to exit the pen through a second port (e.g., 102*b*, recirculation port 702*b*, 802*b*) while the plurality of ejection elements are being activated.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An inkjet pen comprising:
a plurality of fluid ports, including:
an inlet port to direct fluid from a fluid reservoir via a first line to a fluid ejection device, and
a recirculation port to direct fluid from the fluid ejection device via a second line out of the inkjet pen;
a plurality of parallel fluid pressure regulators fluidly coupled with the inlet port, each of the plurality of parallel fluid pressure regulators to receive fluid from the inlet port;
a valve connected to the fluid ejection device and the recirculation port and to open in response to a negative pressure to cause fluid to exit via the recirculation port while fluid is also ejected via the fluid ejection device; and
a controller to cause ejection of fluid from the fluid ejection device and fluid to flow across a back surface of the fluid ejection device.

2. The inkjet pen of claim 1, comprising a filter in fluid communication with the plurality of parallel fluid pressure regulators.

3. The inkjet pen of claim 2, wherein the filter is fluidly coupled between the inlet port and the plurality of parallel fluid pressure regulators.

4. The inkjet pen of claim 2, wherein the filter is fluidly coupled between the plurality of parallel fluid pressure regulators and the fluid ejection device.

5. The inkjet pen of claim 1, wherein the plurality of parallel fluid pressure regulators comprise a pair of parallel fluid pressure regulators.

6. The inkjet pen of claim 1, wherein each of the parallel fluid pressure regulators includes an oblong exit port to enable passage of acoustic energy created by a change in momentum of the fluid.

7. The inkjet pen of claim 1, comprising:
a valve in fluid communication with the recirculation port of the plurality of fluid ports;
wherein in response to negative pressure, the valve is to open to enable the fluid within the inkjet pen to exit via the recirculation port.

8. The inkjet pen of claim 7, wherein the valve comprises a check valve.

9. A method of causing printing fluids to circulate across a back surface of a fluid ejection device within an inkjet pen, the method comprising:
receiving printing fluid in the pen via a first port;

directing the printing fluid from the first port through multiple pressure regulators in parallel to a fluid ejection device;

activating a plurality of ejection elements in the fluid ejection device to cause a first portion of the printing fluid to exit the fluid ejection device; and directing a second portion of the printing fluid across the back surface of a fluidic die of the fluid ejection device and exiting the pen through a second port while the plurality of ejection elements are active.

10. The method of claim 9, wherein causing the second portion of the printing fluid to circulate across the back surface of the fluidic die of the fluid ejection device includes applying a negative pressure to a valve in fluid communication with the second port of the pen.

11. The method of claim 10, comprising causing a third portion of the printing fluid that is not ejected from the fluid ejection device to circulate out of an ejection chamber of the fluid ejection device and towards the second port, circulation of the third portion of the printing fluid being in response to application of the negative pressure, activation of a circulation element, activation of the plurality of ejection elements, or a combination thereof.

12. The method of claim 9, comprising causing the printing fluid to pass through a filter upstream of the parallel pressure regulators.

13. The method of claim 9, comprising causing the printing fluid to pass through a filter downstream of the parallel pressure regulators.

14. A printing device comprising:

a pen comprising a plurality of fluid ejection devices, an inlet port, and an electrical contact, wherein the inlet port is in fluid communication with the plurality of fluid ejection devices;

multiple pressure regulators in fluid communication with the same inlet port; and a printing fluid supply reservoir also in fluid communication with the inlet port;

wherein the electrical contact is to receive signals from a controller to cause ejection of printing fluid from the plurality of fluid ejection devices;

wherein in response to application of a positive pressure at the inlet port, printing fluid is to flow from the inlet fluid port through the multiple pressure regulators in parallel to a portion of a backside of fluidic dies of the plurality of fluid ejection devices while printing fluid is ejected from the plurality of fluid ejection devices.

15. The printing device of claim 14, wherein the multiple pressure regulators each includes an oblong exit port that directs fluid from the pressure regulator to the portion of the backside of fluidic dies.

* * * * *